US012563473B2

(12) United States Patent (10) Patent No.: US 12,563,473 B2
Östervall et al. (45) Date of Patent: Feb. 24, 2026

(54) METHOD FOR ROUTING INFORMATION IN A MESH COMMUNICATION NETWORK

(71) Applicant: LumenRadio AB, Gothenburg (SE)

(72) Inventors: Gauthier Östervall, Gothenburg (SE); Max Sikström, Vänersborg (SE); Michael Karlsson, Kode (SE)

(73) Assignee: LumenRadio AB, Gothenburg (SE)

( * ) Notice: Subject to any disclaimer, the term of this patent is extended or adjusted under 35 U.S.C. 154(b) by 268 days.

(21) Appl. No.: 17/279,492

(22) PCT Filed: Sep. 26, 2019

(86) PCT No.: PCT/SE2019/050923
§ 371 (c)(1),
(2) Date: Mar. 24, 2021

(87) PCT Pub. No.: WO2020/067982
PCT Pub. Date: Apr. 2, 2020

(65) Prior Publication Data
US 2022/0038990 A1    Feb. 3, 2022

(30) Foreign Application Priority Data
Sep. 28, 2018    (SE) .................................... 1851170-9

(51) Int. Cl.
*H04W 40/12*        (2009.01)
*H04L 45/00*        (2022.01)
*H04L 45/12*        (2022.01)
(52) U.S. Cl.
CPC ......... *H04W 40/125* (2013.01); *H04L 45/123* (2013.01); *H04L 45/22* (2013.01)
(58) Field of Classification Search
CPC .... H04W 40/125; H04L 45/123; H04L 45/22; H04L 45/121; H04L 45/122; H04L 45/124; H04L 45/125
See application file for complete search history.

(56) References Cited

U.S. PATENT DOCUMENTS 7,852,761 B2 * 12/2010 Neugebauer .......... H04W 88/04
                                                      370/230.1
8,223,783 B2     7/2012 Shorty et al.
                    (Continued)

FOREIGN PATENT DOCUMENTS

EP          2104280 B1      7/2012
WO      WO-2011059079 A1 *  5/2011   ............. H04L 45/18

OTHER PUBLICATIONS

Optimizations for Route Discovery in Asynchronous Duty-Cycling Wireless Networks, by Tang et al. (Year: 2012).*
(Continued)

*Primary Examiner* — Pao Sinkantarakorn

(74) *Attorney, Agent, or Firm* — Capitol City TechLaw

(57)                    ABSTRACT

The present invention relates to a method for routing information from a source node to a target node in a mesh communicating network comprising a plurality of nodes. Each node comprises a transceiver circuitry and is configured to communicate wirelessly with adjacent nodes. The method comprises: setting a data communication rate for each node, estimating a number of transmissions, ETX, needed for a successful link-local transaction between adjacent nodes in the network, determining alternative routes between the source node and the target node, via one or more transit nodes, determining a rank between the source node and the target node for each alternative routes based on ETX and data communication rate for each transit nodes, and routing information using the route having the lowest rank.

4 Claims, 2 Drawing Sheets

(56) References Cited

U.S. PATENT DOCUMENTS

| | | | |
|---|---|---|---|
| 8,774,050 B2 | 7/2014 | Vasseur et al. | |
| 2008/0069034 A1 | 3/2008 | Buddhikot et al. | |
| 2013/0028104 A1* | 1/2013 | Hui .................... | H04W 40/125 |
| | | | 370/252 |

OTHER PUBLICATIONS

A Metric for Opportunistic Routing in Duty Cycled Wireless Sensor Networks, by Ghadimi et al. (Year: 2012).*
A Survey on Congestion Control for RPL-Based Wireless Sensor Networks, by Lim (Year: 2019).*
RPL Routing Protocol Performance in Smart Grid Applications Based Wireless Sensors: Experimental and Simulated Analysis by Hakeem et al. (Year: 2019).*

* cited by examiner

Time slots

| Nodes | 0 | 1 | 2 | 3 | 4 | 5 | 6 | 7 | 8 | 9 |
|---|---|---|---|---|---|---|---|---|---|---|
| Node 1 (Rate=1) | RX | RX | RX | RX | RX | RX | RX | RX | RX | RX |
| Node 2 (Rate=2) | RX | | RX | | RX | | RX | | RX | |
| Node 3 (Rate=3) | RX | | | RX | | | RX | | | RX |

Time slots

| Nodes | 0 | 1 | 2 | 3 | 4 | 5 | 6 | 7 | 8 | 9 |
|---|---|---|---|---|---|---|---|---|---|---|
| Node 1 (Rate=1) | RX | *Gen* | RX | RX | *TXd* | RX | RX | RX | RX | RX |
| Node 2 (Rate=4) | RX | | | | *RXd* | *TXd* | | | RX | |
| Node 4 (Rate=1) | RX | RX | RX | RX | RX | *RXd* | RX | RX | RX | RX |

Time slots

| Nodes | 0 | 1 | 2 | 3 | 4 | 5 | 6 | 7 | 8 | 9 |
|---|---|---|---|---|---|---|---|---|---|---|
| Node 1 (Rate=1) | RX | *Gen/TXd* | RX | RX | RX | RX | RX | RX | RX | RX |
| Node 3 (Rate=1) | RX | *RXd* | *TXd* | RX | RX | RX | RX | RX | RX | RX |
| Node 4 (Rate=1) | RX | RX | *RXd* | RX | RX | RX | RX | RX | RX | RX |

METHOD FOR ROUTING INFORMATION IN A MESH COMMUNICATION NETWORK

This application claims priority under 35 USC 119(a)-(d) from SE patent application no. 1851170-9 filed Sep. 28, 2018, the entire content of which is incorporated herein by reference.

TECHNICAL FIELD

The present disclosure relates to a method for routing information in a mesh communication network according to claim 1.

BACKGROUND

The basic principle of a mesh communication networks, such as a Wireless Sensor Network (WSN), is to use routing protocols. A commonly used routing protocol in wireless mesh networks for smart homes is Routing Information Protocol (RIP), where routes are calculated to minimize the number of hops a message must make on its way from a source node to a target node.

Another routing protocol that is commonly used in Wireless Sensor Networks, is Routing Protocol designed for Low power and loss networks (RPL), uses an objective function to calculate a rank. Each node tries to minimize its rank in the network. The objective function may take retransmissions due to weak links into consideration.

Some nodes in a mesh network are battery powered, and therefore have access to limited amount of energy. There is an objective in low-power wireless mesh networks to minimize battery consumption. There are a few main energy consumers in these networks; having the radio on in receiver mode, transmitting a packet, and processing in the node. Transmitting packets in a mesh network consume energy. Hence a battery power node would wish to minimize its need to transmit packets in the purpose of forwarding data from other nodes.

By having a network wide synchronized clock each device in a network can wake up periodically to turn the radio on to be able to receive messages. Transmitting devices can transmit the message exactly when the receiving device has its radio on. The transmitting node may know this based on information it can obtain about its neighbours.

To minimize energy consumption, nodes running from battery should select a slow listening rate, and only turn on its radio for listing as rarely as desirable to obtain the wanted performance (latency, etc.).

EP2104280A1 discloses a system using a retransmission-time-based link metric that computes link-costs for a multi-hop wireless network including a success probability for a respective link.

US20080069034A1 discloses interference aware routing in multi-radio wireless mesh networks.

U.S. Pat. No. 8,223,783 discloses using battery-powered nodes in a mesh network.

U.S. Pat. No. 8,774,050 discloses dynamic wake-up time adjustment based on designed paths through a computer network.

Each packet that is routed through a node requires the CPU of the node to be awake and do processing instead of being able to sleep. Hence each packet that gets routed through a node consume power. Furthermore, in addition to consume energy in a battery powered node, this will also cause an unwanted latency in the network when communicating messages.

Therefore, there is a need to develop an improved method for more efficiently route information in a MESH communication network.

SUMMARY

An object of the present disclosure is to provide a method which seeks to reduce the latency in a mesh communication network having battery powered nodes.

This object is obtained by a method for routing information from a source node to a target node in a mesh communicating network comprising a plurality of nodes. Each node comprises a transceiver circuitry and is configured to communicate wirelessly with adjacent nodes. The method comprises: setting a data communication rate for each node, estimating a number of transmissions, ETX, needed for a successful link-local transaction between adjacent nodes in the network, determining alternative routes between the source node and the target node, via one or more transit nodes, determining a rank between the source node and the target node for each alternative routes based on ETX and data communication rate for each transit nodes, and routing information using the route having the lowest rank.

An advantage with the present invention is that the battery life is extended for battery powered nodes.

Another advantage is that a more efficient routing of information in a mesh communication network is achieved.

Further advantages and aspects of the invention may be found in the specification.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figures 1, 2, 3, 4:
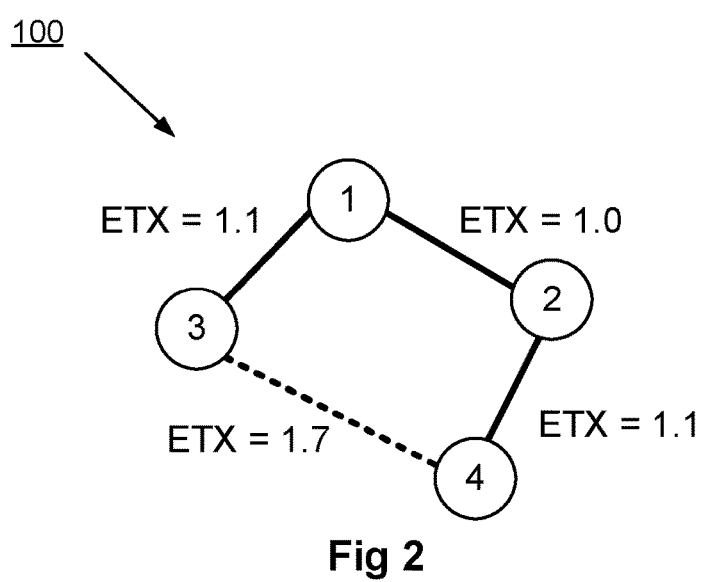
FIG. 1 illustrates three nodes with different data communication rates.
FIG. 2 illustrates a network 100 having four nodes with different estimated number of transmissions needed for a successful link-local transaction between the node and its parent.
FIG. 3 illustrates latency in an example embodiment.
FIG. 4 illustrates improved latency in an example embodiment.

Aspects of the present disclosure will be described more fully hereinafter with reference to the accompanying drawings. The communication network and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a communication system having a plurality of nodes. As part of the development of the example embodiments presented herein, a problem will first be identified and discussed.

In a mesh network time is split into time slots. These slots are numbered, counted from the start of the network. This slot number is called Absolute Slot Number (ASN). A device (i.e. node) may listen in just one out of n (n is at least 1) timeslots. This is called the listening rate.

Nodes in a mesh network may have various performance settings (data communication rates) based on how large batteries it has, how much performance is needed, etc. Some devices may even have mains power, hence can have a very fast communication rate. This is illustrated in FIG. 1 showing three nodes with different data communication rates (Rate 1, 2 and 3) and when each is listening to the transmissions in the mesh network.

As mentioned above, routing in wireless mesh networks (of WSN type and similar) is often tree based routing topologies. A commonly used routing protocol in wireless mesh networks for the smart homes is RIP, where routes are calculated to minimize the number of hops a message must make on its way to the destination. Another routing protocol that is commonly used in Wireless Sensor Networks, RPL, uses an objective function to calculate a rank. Each node tries to minimize its rank in the network. The objective function may take retransmissions due to weak links into consideration.

A node's rank may be calculated as:

$$\text{Rank(node)}=\text{Rank(parent)}+ETX(\text{parent\_link})$$

The ETX (Estimated Transmissions) is an estimated number of transmissions needed for a successful link-local transaction between the node and its parent. Packets may need to be retransmitted due to collisions, disturbances, or weak links causing bit-errors. A network 100 having four nodes are illustrated in FIG. 2.

Calculating a route between node 1 and 4 according to the above formula would result in node 4 having a rank of 2.1 with the route being 1→2→4. The alternate route 1→3→4 is not chosen since it would result in a rank of 2.8.

Even if node 2 is a battery powered node with a slow listening rate, data will not be routed through node 3, as it results in a higher rank according to RPL.

This would result both in unnecessary load on node 2, as well as a longer delivery time (latency) for the packet to arrive to node 4. This is illustrated in FIG. 3.

In FIG. 3, "Gen" is a packet being generated for transmission from the node, "TXd" is packet is transmitted at the time slot when the receiving node can receive, which is indicated by "RXd". "RX" indicate time slots when each node is configured to actively listen.

In the example illustrated in FIG. 3, the packet gets a latency of 5 timeslots and generates one extra transmission for node 2 (which is a battery powered node).

In such scenarios where rates are different between different nodes, it is preferred for data to be routed through nodes with fast rates with mains power over being routed through battery powered nodes, both for the sake of performance and for the sake of battery consumption.

In the present disclosure, a factor is introduced that scales the ETX with the rate, creating a new parameter called ETS (Estimated number of Time Slots) where ETS is a function of Rate and ETX, e.g. ETS=Rate*ETX. By applying this to the case illustrated in connection with FIGS. 3 and 4, rate dependent ranks in the above-mentioned example will be:

$$\text{Rank(Node)}=\text{Rank(parent)}+ETS$$

$$\text{Rank(Node)}=\text{Rank(parent)}+\text{Rate(Node)}*ETX(\text{node to parent\_link})$$

Route option 1 (1→2→4): Rank 5.1
Route option 2 (1→3→4); Rank 2.8
Route option 2 is now the preferred route. This is illustrated in FIG. 4, using the same terminology as for FIG. 3.

Now the latency becomes 2 timeslots, and no unnecessary processing and transmissions in node 2.

In an example embodiment, the mesh network is not divided into time slots. However, the described methodology would still work if each node is configured to periodically wake up, e.g. one node wake up every 5 ms, another node wake up every 500 ms. Nodes being powered by mains may be awake continuously. When a node wakes up, it samples the energy content on the communication channel (RSSI), and if the energy content level is above a predetermined threshold value it stays awake and tries to receive a packet. If the energy content level is below the predetermined threshold value it goes back to sleep. This is illustrated by Node 2 in FIG. 3

In order to be able to transmit information to these nodes, the transmitting node has to place a carrier wave on the channel during a time equal the time between wakeup for the destination node. Only then may the packet be transmitted. This wake-up signal (i.e. the carrier wave) pollutes the aerial interface and this should be minimized. This is achieved by choosing nodes with shorter time periods between wake-up, or even better the nodes that are always awake (since no carrier wave is required) when calculating rank for alternative routes.

Figure 5:
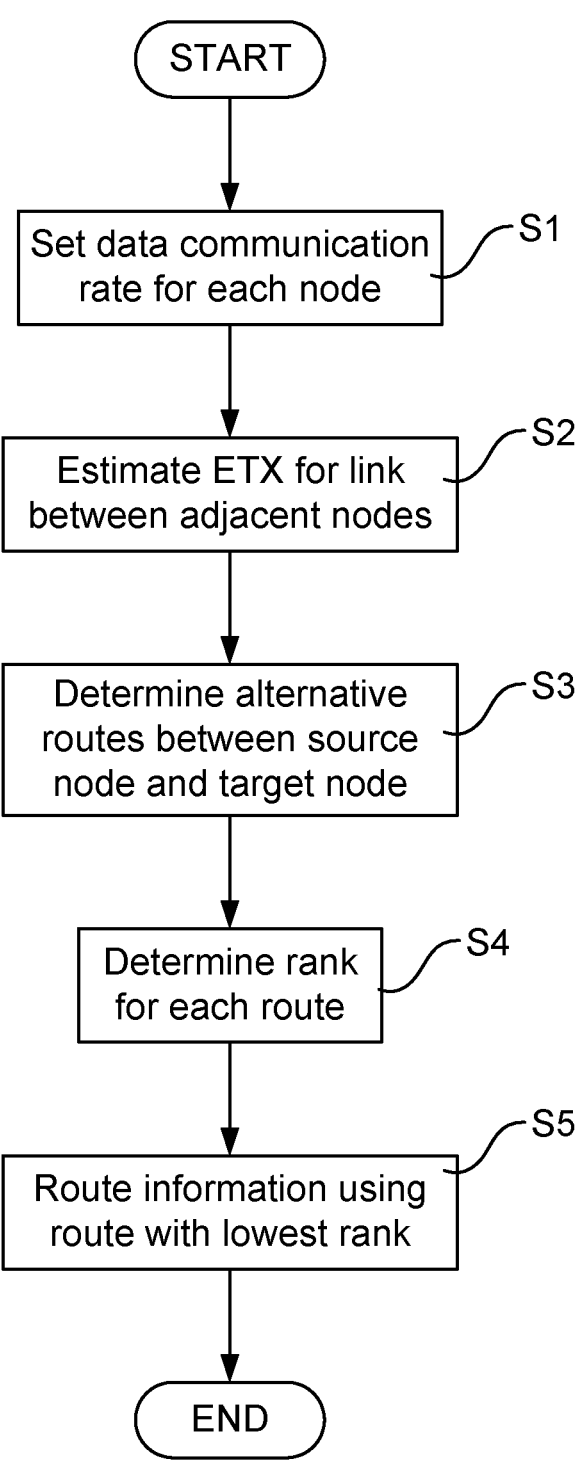
FIG. 5 illustrates a flowchart for routing information from a source node to a target node in a mesh communicating network.

FIG. 5 is a flow chart illustrating a method for routing information from a source node to a target node in a mesh communicating network comprising a plurality of nodes, each node comprises a transceiver circuitry and is configured to communicate wirelessly with adjacent nodes. The method comprises: setting S1 a data communication rate for each node; estimating S2 a number of transmissions, ETX, needed for a successful link-local transaction between adjacent nodes in the network; determining S3 alternative routes between the source node and the target node, via one or more transit nodes; determining S4 a rank between the source node and the target node for each alternative routes based on ETX and data communication rate for each transit nodes; and routing S5 information using the route having the lowest rank.

According to some embodiments, the mesh communication network is divided into time slots, and each node is configured to listening for communication within the network at regularly spaced time slots being separated based on the data communication rate.

According to some embodiment, the data communication rate for each node represents the time when each node periodically wake-up.

According to some embodiments, each transit node and target node has a parent node, and the rank is further based on the rank of the parent node. According to some embodiments, the rank is calculated using the formula:

$$\text{Rank(node)}=\text{Rank(parent)}+\text{Rate(node)}*ETX(\text{node to parent\_link})$$

wherein Rank(node) is the rank for either a transit node or the target node, Rank(parent) is the rank of the parent, Rate is the data communication rate of the transit node or the target node, and ETX(parent_link) is the estimated number of transmission needed between the transit node or the target node and the parent node.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for routing information from a source node to a target node in a mesh communication network including a plurality of nodes, each node having a transceiver circuitry and being configured to communicate wirelessly with adjacent nodes, the method comprising:

setting a data communication rate for each node, wherein the data communication rate is based on performance settings of each node and represents the time when each node periodically wake-up;

estimating a number of transmissions, (ETX), needed for a successful link-local transaction between adjacent nodes in the network;

determining alternative routes between the source node and the target node, via one or more transit nodes;

determining a route rank between the source node and the target node for each alternative route based on the ETX and the data communication rate for each transit node; and routing information using the alternative route having a lowest route rank;

wherein each transit node and the target node in an alternative route has a parent node, and wherein the route rank is determined based on a node rank calculated for each transit node and the target node in the alternative route;

wherein the node rank for a given node is derived from both the node rank of its parent node and a product of the ETX from the parent link and the data communication rate of the given node.

2. The method according to claim 1, wherein the mesh communication network is divided into time slots; and wherein each node is configured to listen for communication within the network at regularly spaced time slots being separated based on the data communication rate.

3. A node in a mesh communication network including a plurality of nodes, each node having a data communication rate that represents the time when each node periodically wake-up, and each node having a transceiver circuitry and being configured to communicate wirelessly with adjacent nodes;

wherein the node is a source node and is configured to:

estimate a number of transmissions, (ETX), needed for a successful link-local transaction between adjacent nodes in the network;

determine alternative routes between the node and a target node, via one or more transit nodes;

determine a route rank between the node and the target node for each alternative route based on the ETX and the data communication rate for each transit node; and route information using the alternative route having a lowest route rank;

wherein each transit node and the target node in an alternative route has a parent node, and wherein the route rank is determined based on a node rank calculated for each transit node and the target node in the alternative route;

wherein the node rank for a given node is derived from both the node rank of its parent node and a product of the ETX from the parent link and the data communication rate of the given node.

4. A non-transitory computer readable medium having stored thereon a computer program for routing information from a source node to a target node in a mesh communication network, and having instructions which, when executed on at least one processor, cause the at least one processor to carry out a method comprising:

setting a data communication rate for each node, wherein the data communication rate is based on performance settings of each node and represents the time when each node periodically wake-up;

estimating a number of transmissions, (ETX), needed for a successful link-local transaction between adjacent nodes in the network;

determining alternative routes between the source node and the target node, via one or more transit nodes;

determining a route rank between the source node and the target node for each alternative route based on the ETX and the data communication rate for each transit node; and routing information using the alternative route having a lowest route rank;

wherein each transit node and the target node in an alternative route has a parent node, and wherein the route rank is determined based on a node rank calculated for each transit node and the target node in the alternative route;

wherein the node rank for a given node is derived from both the node rank of its parent node and a product of the ETX from the parent link and the data communication rate of the given node.

\*   \*   \*   \*   \*